United States Patent
Bist et al.

(10) Patent No.: US 12,218,786 B1
(45) Date of Patent: Feb. 4, 2025

(54) CLOCK RECOVERY FOR PAM4 SIGNALING USING BIN-MAP

(71) Applicant: Cadence Design Systems, Inc., San Jose, CA (US)

(72) Inventors: Hemlata Bist, Noida (IN); Rohit Mishra, Noida (IN); Harshit Jaiswal, Agra (IN); Shubham Agarwal, Gorakhpur (IN)

(73) Assignee: Cadence Design Systems, Inc., San Jose, CA (US)

( * ) Notice: Subject to any disclaimer, the term of this patent is extended or adjusted under 35 U.S.C. 154(b) by 106 days.

(21) Appl. No.: 17/991,747

(22) Filed: Nov. 21, 2022

(51) Int. Cl.
*H04L 25/49* (2006.01)
*H04B 14/02* (2006.01)
*H04L 7/00* (2006.01)
*H04L 7/033* (2006.01)

(52) U.S. Cl.
CPC ....... *H04L 25/4921* (2013.01); *H04B 14/023* (2013.01); *H04L 7/0079* (2013.01); *H04L 7/0334* (2013.01)

(58) Field of Classification Search
CPC ............ H04L 25/4917; H04L 25/4921; H04L 7/0016; H04L 7/0079; H04L 7/033; H04L 7/0334; H04B 14/023; H04B 3/00; H04B 3/02

See application file for complete search history.

(56) References Cited

U.S. PATENT DOCUMENTS

| | | | | |
|---|---|---|---|---|
| 10,142,089 B2* | 11/2018 | Yao | ................. | H04L 7/0334 |
| 11,477,059 B2* | 10/2022 | Wang | ................. | H04L 25/4917 |
| 11,757,613 B2* | 9/2023 | Yue | ................. | H04L 7/033 |
| | | | | 375/226 |
| 2022/0190999 A1* | 6/2022 | Ju | ................. | H04L 7/0079 |

* cited by examiner

*Primary Examiner* — Betsy Deppe
(74) *Attorney, Agent, or Firm* — Foley & Lardner LLP (57) ABSTRACT

A technical solution is directed to a clock recovery apparatus for multi-level signaling on a single-lane communication interface. The apparatus can use bin-map logic to successfully recover a common clock per symbol received on the multi-level signal interface. The multi-level signal can be PAM4 signaling where two bits are encoded to represent four levels. The clock recovery apparatus can detect signal level through individual edge detectors for each of the two bits and can handle jitter up to half-clock period.

19 Claims, 9 Drawing Sheets

CLOCK RECOVERY FOR PAM4 SIGNALING USING BIN-MAP

TECHNICAL FIELD

The present implementations relate generally to computer networks, and more particularly to methods and apparatuses for clock recovery in computer network signaling schemes such as PAM4.

INTRODUCTION

Electronic communication is increasingly exposed to deployments and situations with strict demands on responsiveness (e.g. speed, reliability). In the event that electronic communication is not able to meet strict demands on responsiveness, the scope of use of electronic communication is reduced, and the reliability of electronic communication is not sufficient to effectively and efficiently address deployment in a significant number of desired deployments and situations.

One problem that affects responsiveness—particularly in high speed electronic communication designs in the range of 50 Gbps or higher—is that of jitter. In electronic communication designs, jitter is the problem of a presumably periodic signal deviating from true periodicity, often in relation to a reference clock signal, which presumably periodic signal is conveyed across a communication link between a transmitter and a receiver. When not appropriately accounted for and/or remedied, jitter can cause responsiveness issues such as loss of data and loss of synchronization between the transmitter and receiver.

It is against this technological backdrop that the present Applicant sought a technological solution to these and other issues deeply rooted in this technology.

SUMMARY

Aspects of this technical solution are directed to a clock recovery apparatus for multi-level signaling on a single lane communication interface. The apparatus can use bin-map logic to successfully recover a common clock per symbol received on the multi-level signal interface. The multi-level signal can be PAM4 signaling where two bits are encoded to represents four levels. The clock recovery apparatus can detect signal level through edge detectors for each of the two bits and can handle jitter up-to half clock period.

The communication interface can include an Ethernet stack having a physical communication layer, and the physical communication layer can include a physical medium attachment (PMA) layer of the Ethernet stack. The communication interface can be configured for signaling rates of 50 Gbps or higher.

A device can include a physical communication layer integrated with a communication interface, the physical communication layer configured to encode and decode data in accordance with the multi-level signaling scheme (e.g. PAM4). The device can further include a clock recovery apparatus for recovering a common clock for each received symbol in the multi-level signaling scheme.

A method can include obtaining data at a physical communication layer, encoding data in accordance with a multi-level signaling scheme, decoding data comprising multi-bit symbols, recovering a common clock for each received symbol and transmitting data at the physical communication layer.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting. Rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Present implementations provide a technical improvement that improves synchronization between transmit and receive sides of network communication devices and interfaces, for example communication devices and interfaces including an Ethernet stack.

According to certain aspects, the present Applicant recognizes that line encoding signaling determines how the binary data will be represented on the link. There are several signaling schemes available, including for example NRZ, PAM4, Manchester, and Differential. Clock recovery allows creating a clock from the data signals received at the receiver end without the need of sending a separate clock from the transmitter.

According to certain additional aspects, the present embodiments relate to a clock recovery apparatus for multi-level signaling on a single lane interface. In some embodiments, the multi-level signaling is PAM4 where two bits are encoded to represents four levels. In these and other embodiments, a clock recovery apparatus using a bin-map approach successfully recovers common clock per symbol by detecting a signal level through an edge detector once per bit and handles jitter of up to half a clock period.

The present implementations will be described in detail in connection with challenges in clock recovery of PAM4 signaling, as recognized by the present Applicant. However, the embodiments are not limited to this example, and those skilled in the art will understand how to apply the principles described herein to other multi-level signaling schemes after being taught by the present examples.

Figure 1:
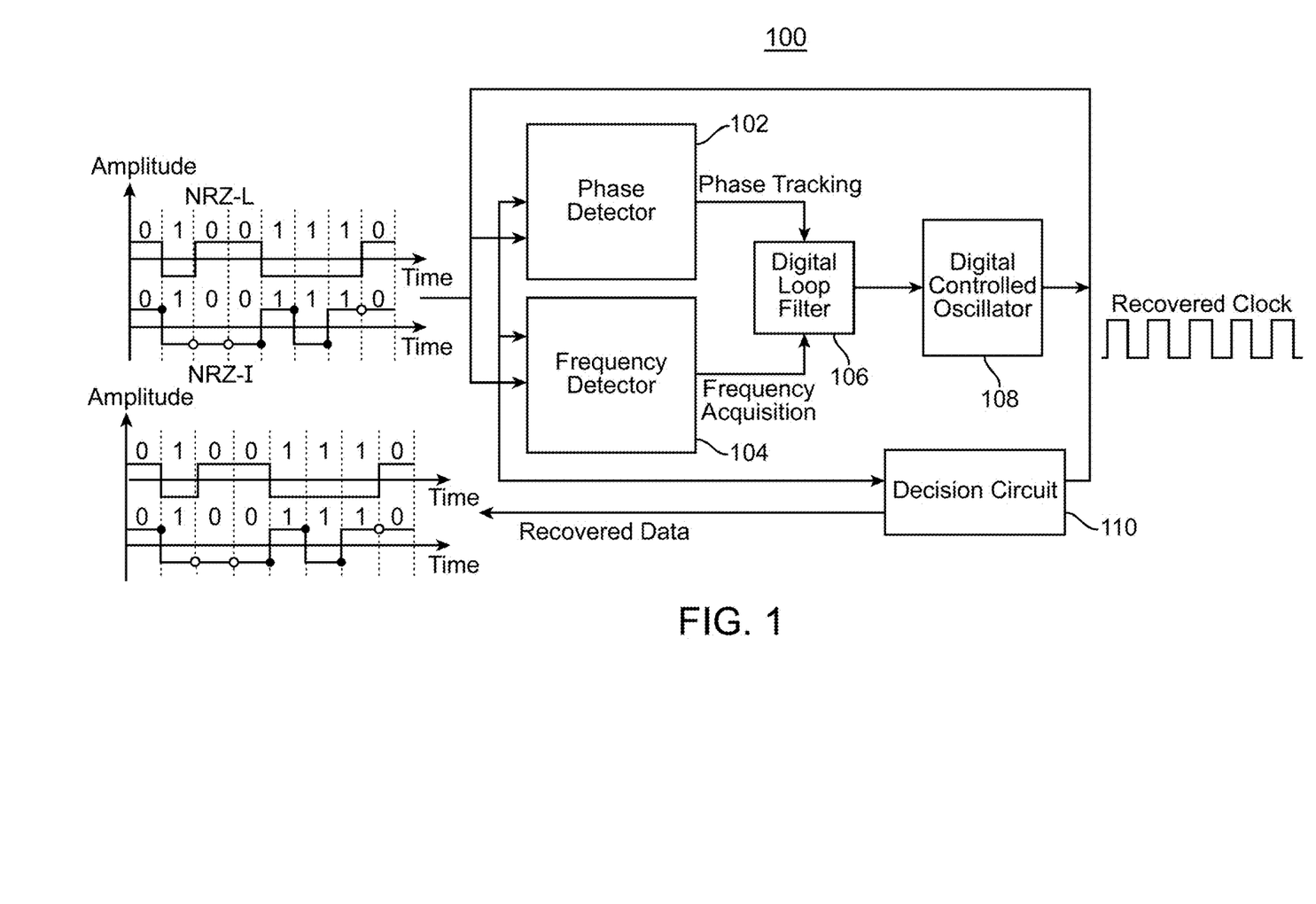
FIG. 1 is a functional block diagram illustrating an example clock and data recovery (CDR) device and method for a NRZ line encoding scheme.

To further assist in understanding certain aspects of the present implementations, reference is made to single-level signaling schemes such as non-return to zero (NRZ). FIG. 1 is a functional block diagram illustrating an example clock and data recovery (CDR) device and method for a NRZ line encoding scheme.

Non-return to zero (NRZ) signaling uses a single bit to represent data on the lane. For example, in one variation called NRZ-L, a NRZ line code is a binary code in which ones are represented by one significant condition, usually a positive or negative voltage, while zeros are represented by some opposite significant condition, usually a negative or positive voltage, with no other neutral or rest condition. In another variation called NRZ-I, ones are represented by a change in signal level from the previous signal level, and zeros are represented by no change in signal level.

As shown in the example of FIG. 1, NRZ data (encoded as either NRZ-L or NRZ-I) is provided to a clock recovery block 100, for example in parallel to both a phase detector 102 and frequency detector 104 in block 100. Phase detector 102 performs phase tracking, and frequency detector 104 performs frequency acquisition. The outputs of 102 and 104 are provided to digital loop filter 106. The output of digital loop filter 106 is used to control a digital controlled oscillator 108, which produces a recovered clock signal. In this example, the recovered clock signal can also be provided to a decision circuit 110, which can also receive the NRZ data and produce a recovered data signal. As further shown in FIG. 1, the recovered clock signal can also be fed back to phase detector 102 and frequency detector 104. It should be noted that clock recovery block 100 can receive a reference clock (not shown), for example for assisting in providing phase detection and/or frequency acquisition by one or both of phase detector 102 and frequency detector 104 and/or producing a recovered clock by digital controlled oscillator 108.

The scheme of FIG. 1 is adequate for some NRZ designs. However, because it is inherently non-synchronized, jitter can be a problem as set forth above. Moreover, bandwidth can be an issue for NRZ, particularly in high-speed designs. One possible solution to assist with jitter is to include a parallel clock and/or synchronization scheme. However, this possible solution adds complexity and additional circuitry to designs.

Among other things, the present Applicant recognizes that another way to achieve higher signaling rates on a single lane or channel is to use multi-level signaling such as PAM4. PAM4 is increasingly being used for high-speed interfaces due to its bandwidth efficiency because it halves the required frequency. For example, PAM4 signaling is used in high-speed protocols such as PCIe, Ethernet, USB.

PAM4 signaling halves the frequency required by signaling schemes such as NRZ by using two bits to represent data on the lane, resulting in four levels. This is compared to NRZ where the line encoding uses single bit (and two levels) to represent data on the lane. So it is possible to obtain double the bandwidth with PAM4 as compared to NRZ while using the same signaling frequency. However, the present Applicant recognizes that although desirable from a bandwidth standpoint, multi-level signaling comes with clock recovery challenges, among other things.

Figure 2:
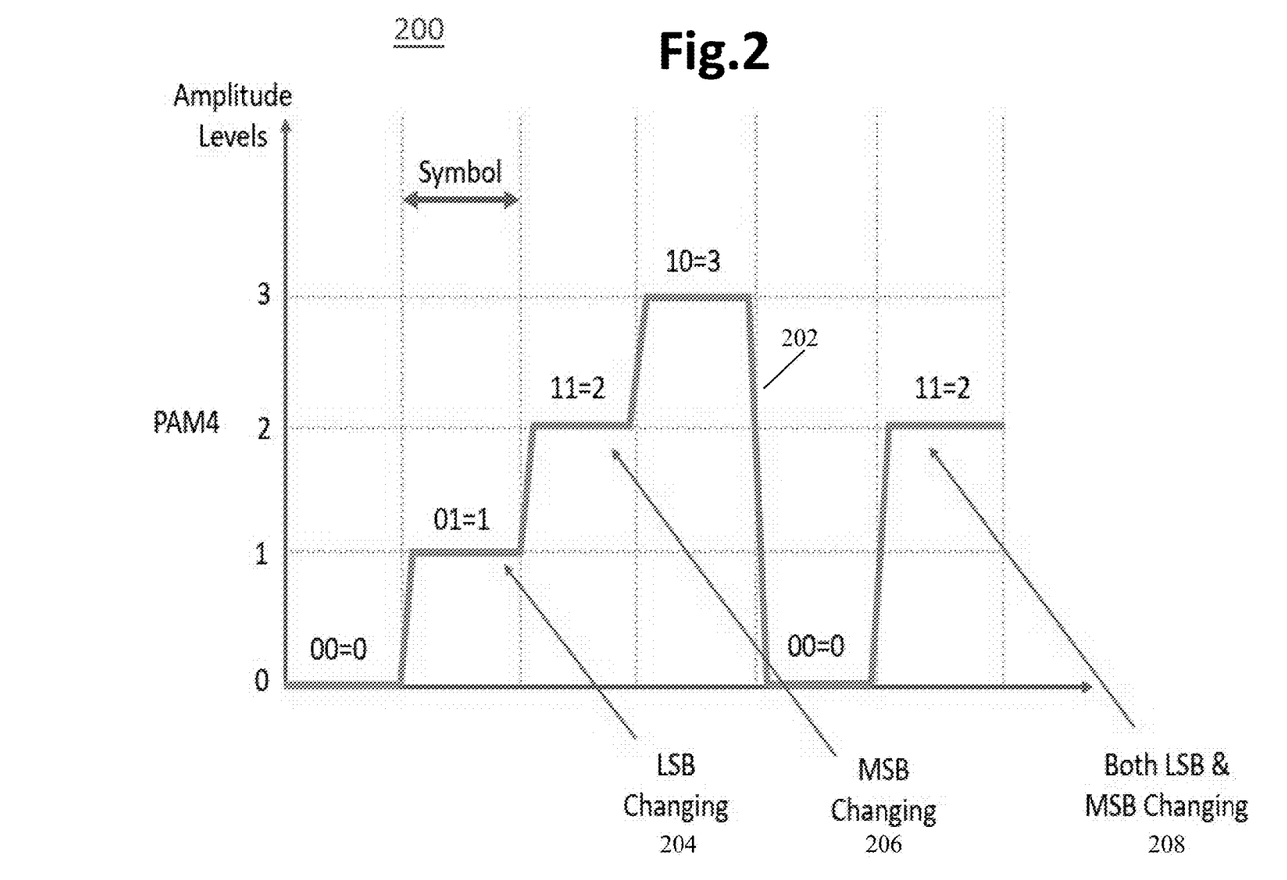
FIG. 2 is a diagram illustrating example aspects of PAM4 encoding.

FIG. 2 (200) shows aspects of a PAM4 (4-level pulse amplitude modulation) encoding scheme. As shown, in an example PAM4 encoded signal 202 (200), two bits of data are encoded into one of four amplitude levels. A first level (corresponding to amplitude 0) is used to encode two bits of data "00". A second level (corresponding to amplitude 1) is used to encode two bits of data "01". A third level (corresponding to amplitude 2) is used to encode two bits of data "11". A fourth level (corresponding to amplitude 3) is used to encode two bits of data "10".

As further shown in FIG. 2, clock recovery is typically done by detecting the signal level once per symbol period using one edge detector per bit. Accordingly, when a signal includes adjacent symbols that transition between levels, such as between amplitude 1 and amplitude 2, this transition can be detected using edge detection. However, as shown in FIG. 2, when the signal transitions between a symbol having amplitude 1 and a symbol having amplitude 2, this corresponds to only one bit of data change, particularly to the LSB changing from 0 to 1 in 204. Likewise, when the signal transitions between a symbol having amplitude 2 and a symbol having amplitude 3, this also corresponds to only one bit of data change, particularly to the MSB changing from 0 to 1 in 206. On the contrary, when the signal transitions between a symbol having amplitude 0 and a symbol having amplitude 2, this corresponds to two bits of data change, particularly to both the LSB and MSB changing from 0 to 1 in 208. This can cause different jitter value for each bit per symbol, and make it difficult to recover a common clock per symbol, which the present Applicant recognizes is a clock recovery challenge when using PAM4 multi-level signaling.

According to certain aspects, therefore, embodiments are directed to a clock recovery apparatus for multi-level signaling PAM4 on single lane interface. In some embodiments described in more detail below, a bin-map approach is used to successfully recover a common clock per symbol for PAM4 by detecting signal level through an edge detector for each bit and is capable of handling jitter up to half a clock period.

Figure 3:
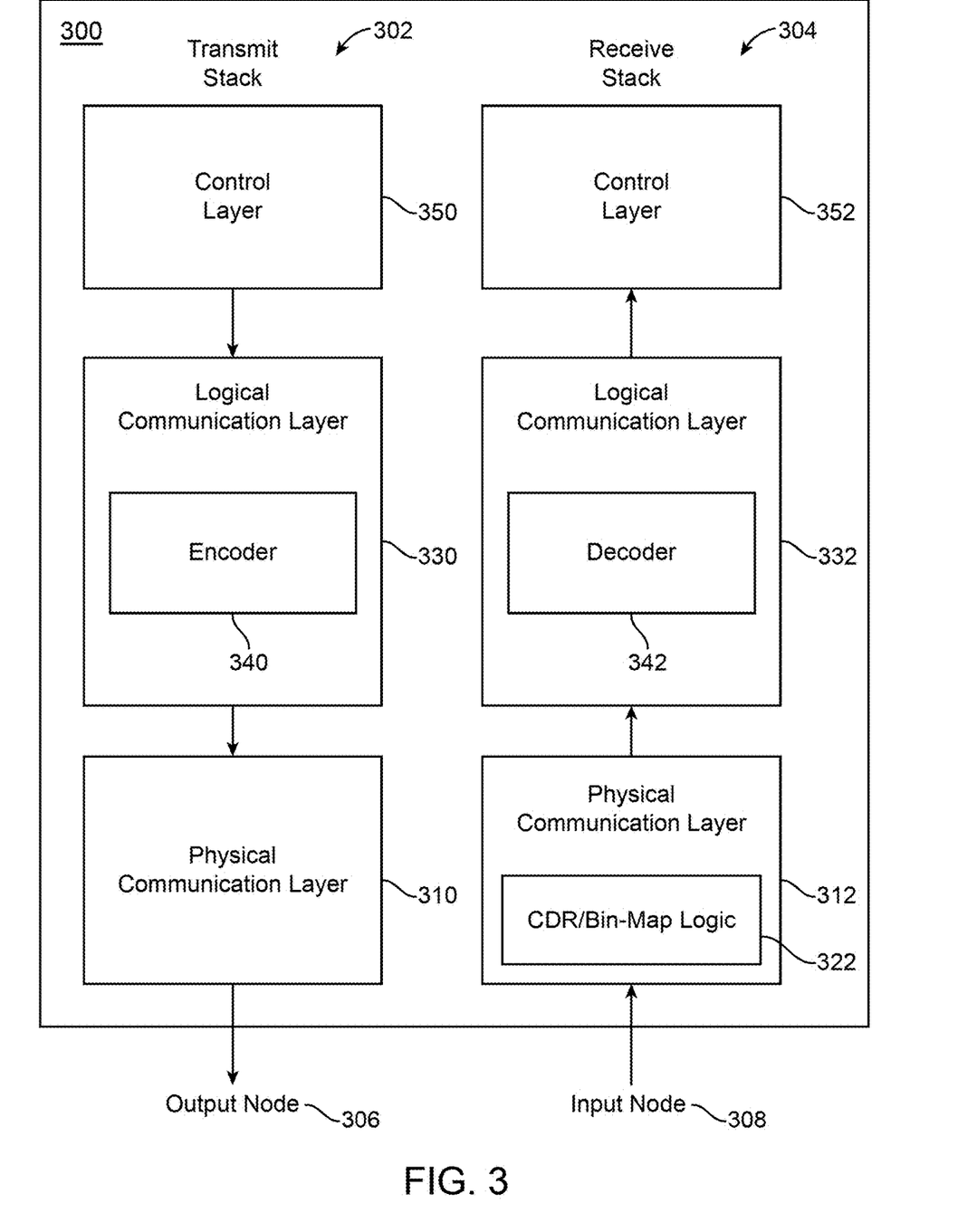
FIG. 3 is a block diagram illustrating a transmit/receive device having an Ethernet stack, in accordance with present implementations.

FIG. 3 illustrates a device, in accordance with present implementations. According to aspects of the present disclosure, the device includes a full-stack high speed communication protocol stack.

As illustrated by way of example in FIG. 3, a device 300 can include a transmit stack 302, a receive stack 304, an output node 306, and an input node 308. The transmit stack 302 and receive stack 304 can each include a plurality of layers. Each of the layers can correspond to various communication processing components of a network communication device or network communication interface. For example, the transmit stack 302 can include communication processing components corresponding to communication to send a transmission by the output node 306, according at least partially to one or more Ethernet protocols. For example, the receive stack 304 can include communication processing components corresponding to communication to receive a transmission by the input node 308, according at least partially to one or more Ethernet protocols. One or more of the input node 306 and the output node 308 can be operatively coupled with one or more external network communication devices, electronic or electrical devices, or any combination thereof.

The device 300 can include a physical or logical device, and can be integrated into a physical communication device or a verification device. A physical communication device can include one or more hardware elements to perform an electronic communication. For example, a physical communication device can include one or more of a portion of a solid state electronic device, a portion of an integrated circuit, and a chipset including one or more integrated circuit devices, or any combination thereof. For example, the physical communication device can be integrated into a handset, mobile computer, smartphone, or the like. A verification device can include a physical or virtual device, and can perform one or more testing operations during or in connection with operation of the device 300. For example, the verification device can be configured to monitor one or more aspects of operation of the physical communication device.

The transmit stack 302 can include a physical communication layer 310, a logical communication layer 330, and a control layer 350. The transmit stack 302 can perform a communication from the control layer 350 to the physical communication layer 310. The receive stack 304 can include a physical communication layer 312, a logical communication layer 332, and a control layer 352. The receive stack 304 can perform a communication from the physical communication layer 312 to the control layer 352.

The physical communication layers 310 and 312 can include one or more electrical or electronic components to transmit or translate communication from the network communication device or interface to or from an external device or interface. According to certain aspects of embodiments, layers 310 and 312 can include line encoding/decoding functionality based on how the binary data is represented on the link. There are several signaling schemes available, including for example NRZ, PAM4, Manchester, Differential, etc. According to certain additional aspects of the embodiments, the physical communication layer 312 in the receive stack 304 can include a clock data recovery (CDR) block 322. The CDR 322 can include bin-map logic to recover a common clock from a multi-bit symbol as described in more detail below.

The logical communication layer 330 can include one or more electrical or electronic components to transmit or translate communication across layers of the network communication device or interface. For example, the logical communication layer 330 can include a Physical Coding Sublayer (PCS) layer in accordance with an Ethernet communication protocol.

The logical communication layer 330 can include an encoder 340. The encoder 340 can transform at least a portion of a data packet into a format compatible with the physical communication layer 310. For example, the encoder 340 can generate an encoded block compatible with an Ethernet protocol. The logical communication layer 332 can include a decoder 342. The decoder 342 can correspond at least partially in one or more of structure and operation to the encoder 340. For example, the decoder 342 can perform a reverse, inverse, or converse of one or more encoding operations performable by the encoder 340. For example, a sequential operation of the encoder and the decoder on a particular data packet or data object can return the original input data packet or data object.

The control layer 350 can include one or more electrical or electronic components to execute logical decision flows. For example, the control layer 350 can include one or more message handlers, authentication processors, data integrity validation components, or any combination thereof. For example, the control layer 350 can include a MAC layer in accordance with an Ethernet communication protocol.

Figure 4A:
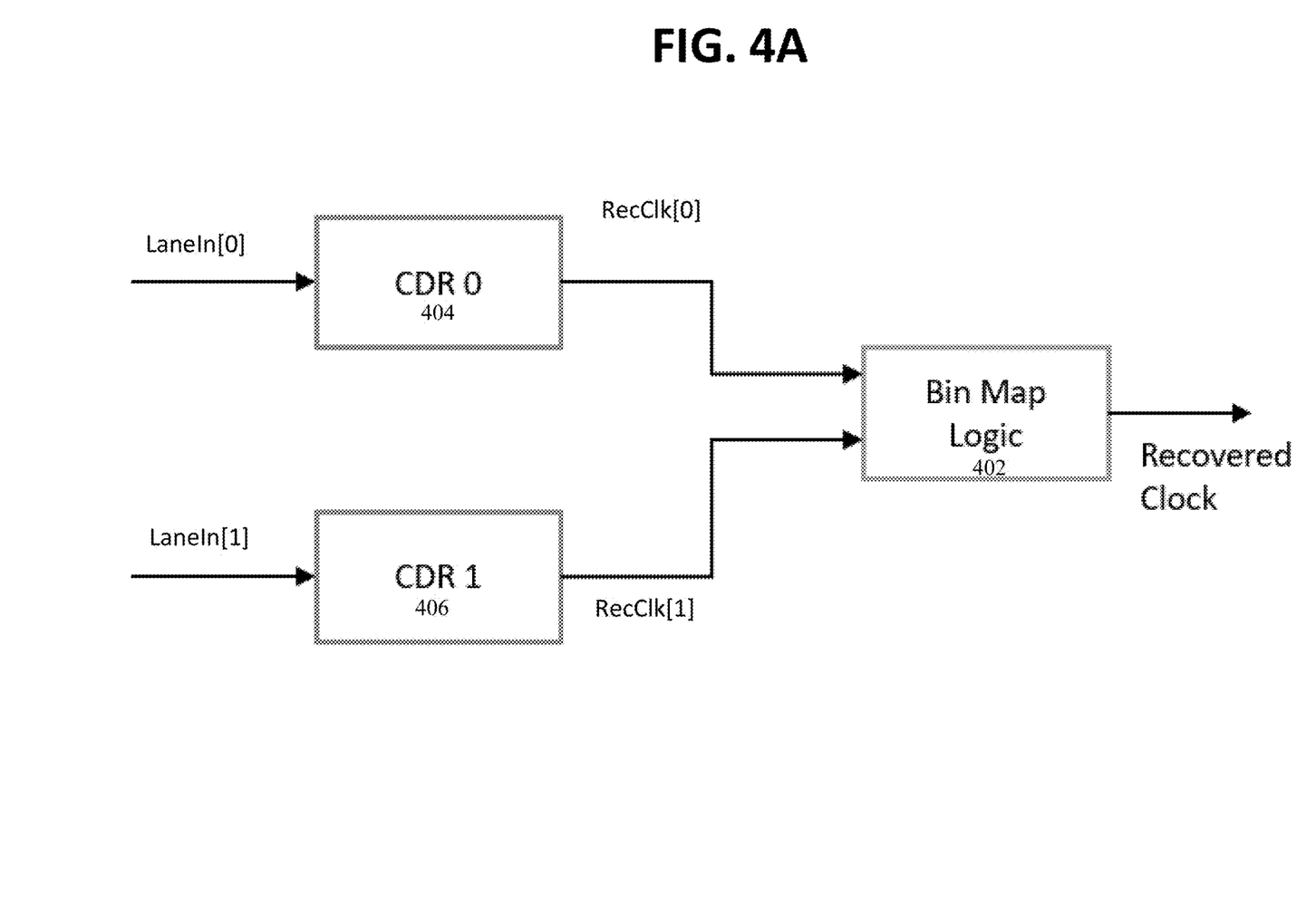
FIGS. 4A and 4B are block diagrams illustrating an example clock recovery apparatus, in accordance with present implementations.

FIG. 4A is a block diagram illustrating an example clock recovery apparatus for a multi-level signaling scheme according to embodiments.

As shown, apparatus includes bin map logic 402 that receives the recovered clock outputs of CDR0 404 and CDR1 406. According to aspects of the embodiments, bin map logic 402 provides a solution for clock recovery in multi-level signaling schemes such as PAM4, handles wide jitter variation, is a lightweight circuit, and is relevant for Design Intellectual Property (DIP), Verification Intellectual Property (DIP) and Accelerated Verification Intellectual Property (AVIP) blocks.

As further shown in FIG. 4A, two separate clocks can be created by CDR0 404 and CDR1 406 for each of the two bits in the PAM4 signaling scheme using the same or similar approach as used in NRZ. However, creating a common reference clock using these two separate clocks is a challenge. Among other things, therefore, the present Applicant recognizes that there is a need for an effective solution to recover a common clock for PAM4 signaling.

Accordingly, in embodiments, an individual bit clock (i.e. RecClk[0] and RecClk[1]) is first recovered by CDR0 404 and CDR1 406 for each bit by detecting the signal level once per symbol period using one edge detector per bit. Then both the clocks are passed on to bin map logic 402 to recover a common clock.

In embodiments, CDR0 404 and CDR1 406 can be implemented using some or all of the components of a circuit 100 such as that shown in FIG. 1 and described above in connection with the NRZ scheme. Accordingly, further details thereof will be omitted here for sake of clarity of the embodiments.

Figure 4B:
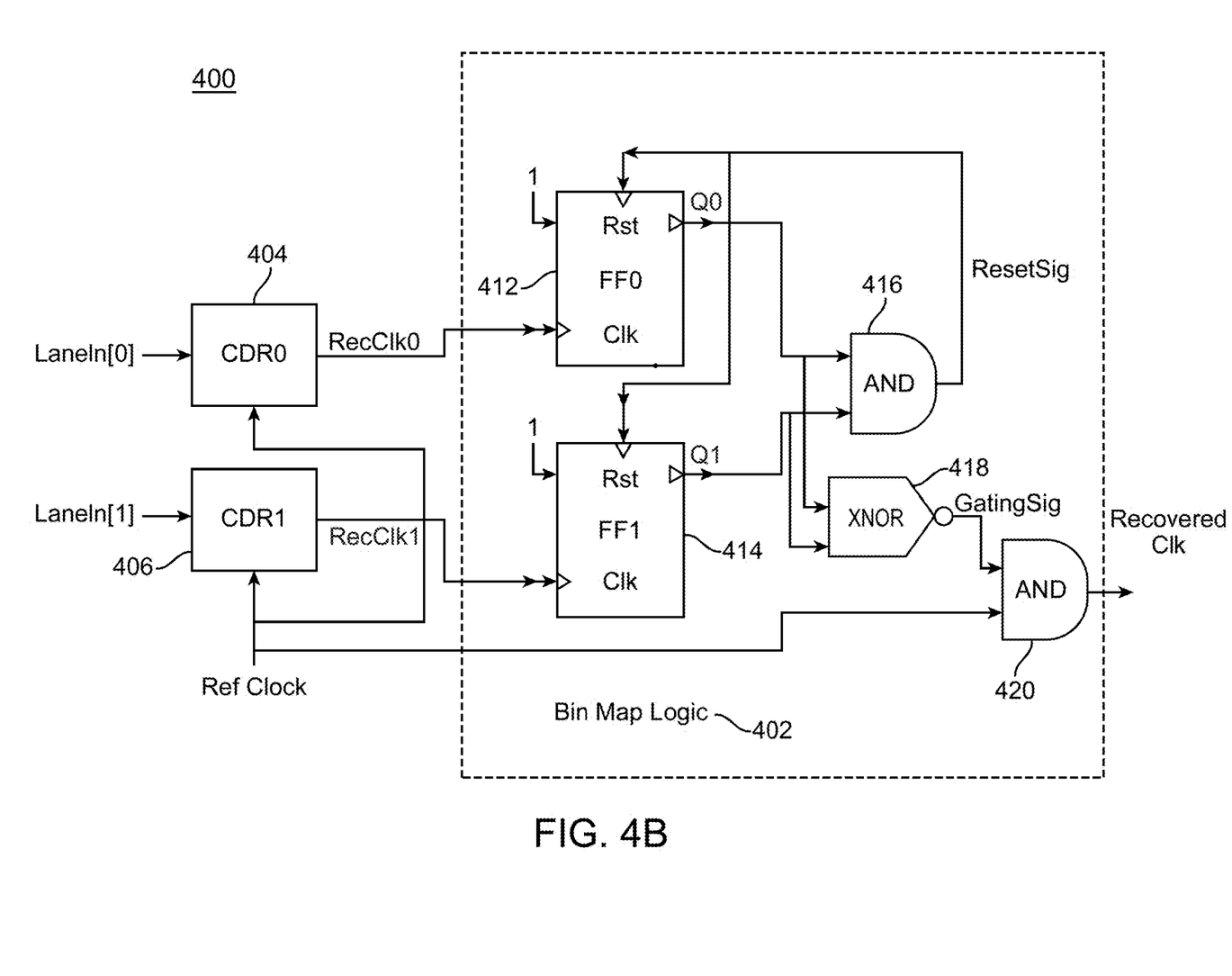

FIG. 4B is an example circuit diagram 400 for implementing bin map logic 402. As shown, the bit-wise CDRs (CDR0 404 and CDR1 406) feed independently recovered clocks (RecClk0 and RecClk1) to bin map logic 402. As set forth above, the bit-wise CDRs perform their clock recovery using a reference clock (Ref Clock). Bin map logic 402 detects the last active edge between the independently recovered clocks (RecClk0 and RecClk1) using flip-flops FF0 412 and FF1 414, respectively. Once the edges of the both clocks (Q0 and Q1) are detected by AND gate 416, the bin map flip flops 412, 414 are reset using the output of AND gate 416. The XNOR gate 418 ensures that the edges of Q0 and Q1 get detected. The AND gate 420 creates the recovered output clock by AND-ing the Ref Clock and the gating signal (GatingSig), which is the output of the XNOR gate 418. The result is a Recovered Clock for the received PAM4 signal.

Figure 5:
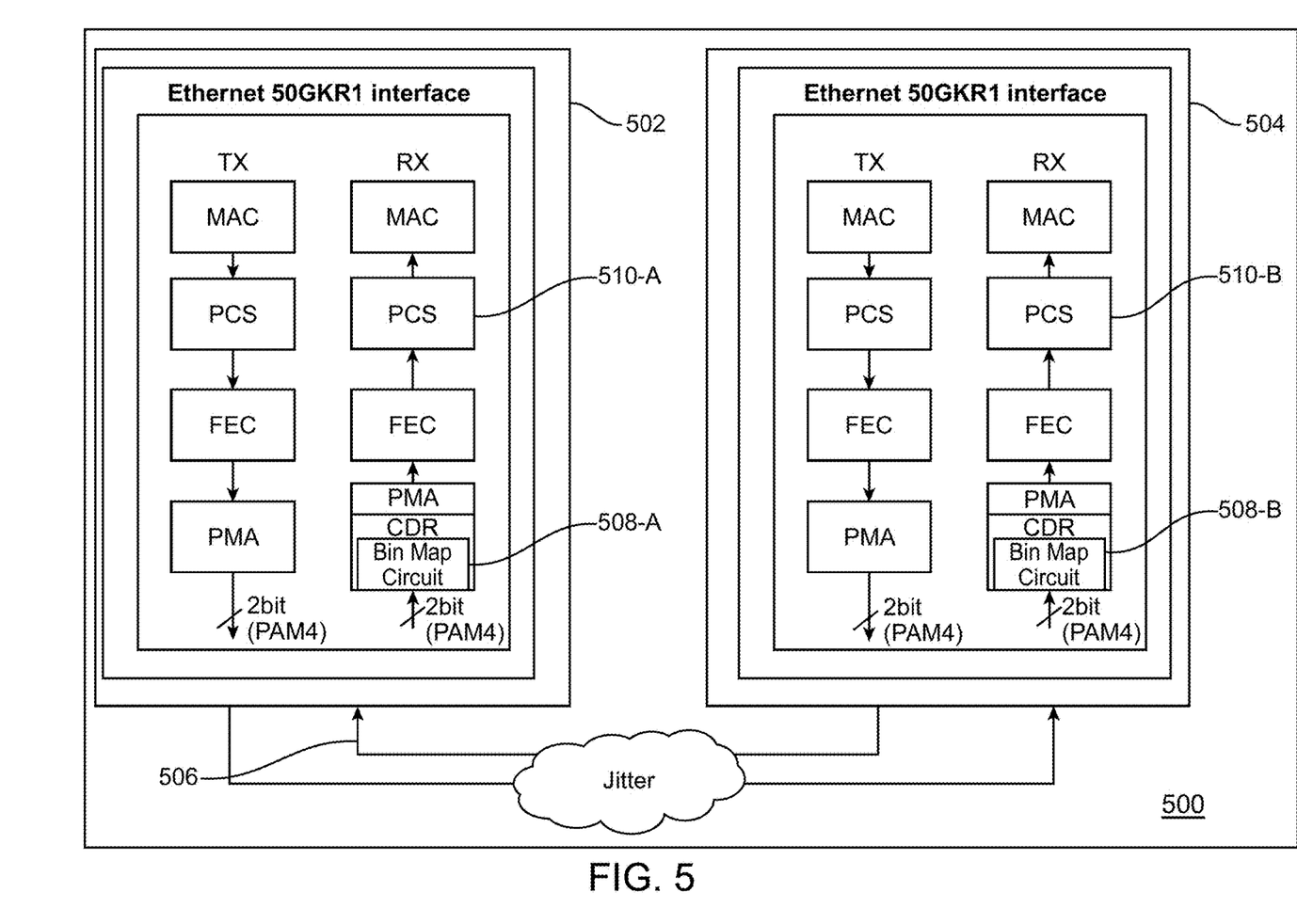
FIG. 5 illustrates a system, in accordance with present implementations.

FIG. 5 is a block diagram of a system that can be used to verify a clock recovery scheme using bin map logic in accordance with embodiments. As shown, the system includes VIP agents 502 and 504, each including an Ethernet 50GKR1 full-stack 510-A and 510-B, respectively. The stacks 510-A and 510-B can be Ethernet implementations of the transmit/receive stacks shown in FIG. 3. The Ethernet VIP agents 502 and 504 are connected back-to-back in a Universal Verification Methodology (UVM) based test environment. Interface 506 is an Ethernet 50GKR1 interface configured for 50 Gbps speed on a single lane, and using PAM4 signaling. A clock recovery apparatus 508-A and 508-B according to embodiments is incorporated into agents 502 and 504, respectively, for multi-level signaling PAM4 on the single lane interface using bin-map logic (e.g. bin map logic 402 and apparatus 400 as described above in connection with FIGS. 4A and 4B). As further shown in the example of FIG. 5, the bin-map logic of embodiments is incorporated in a PMA layer of the receive stacks in interfaces 510-A and 510-B.

Figure 6:
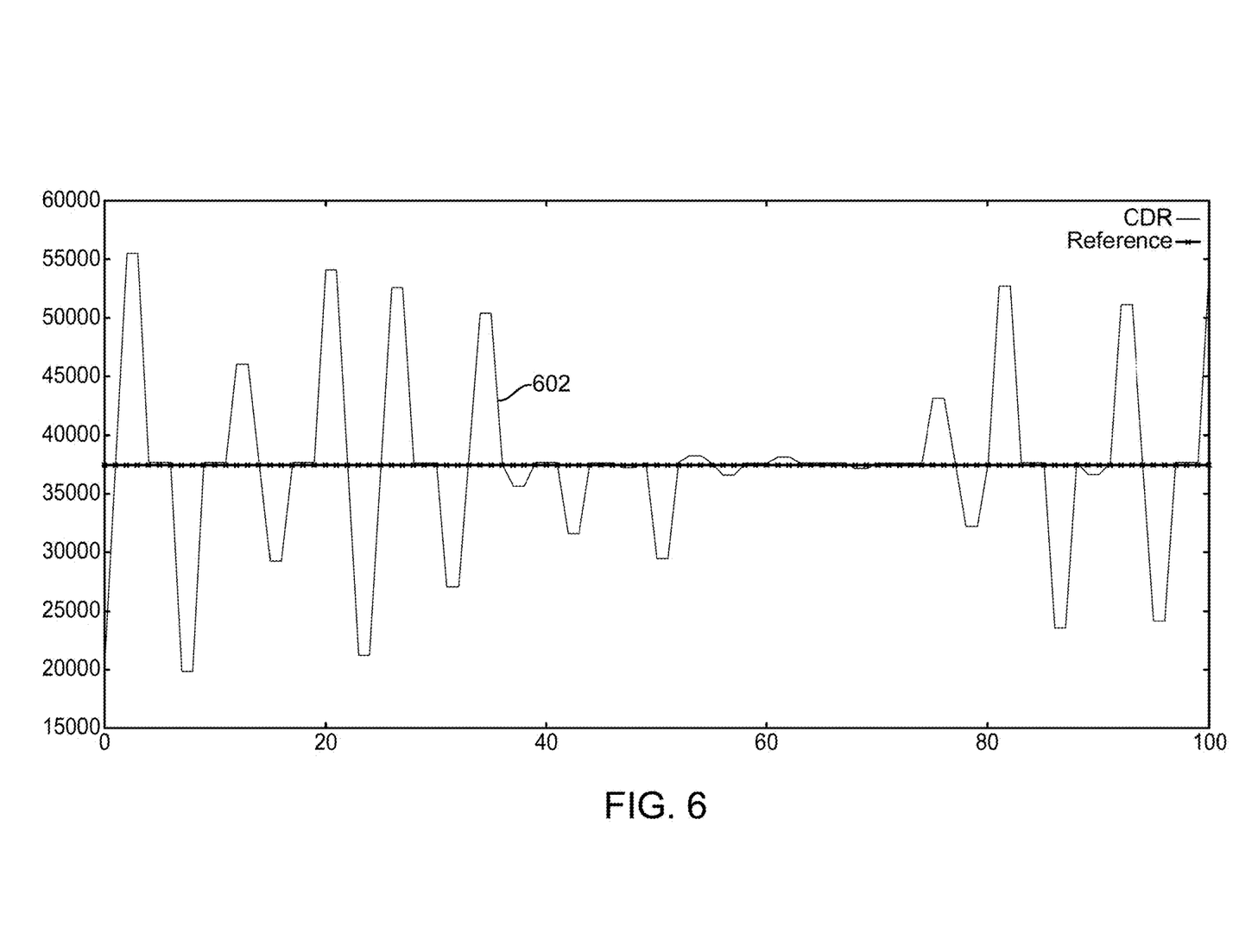
FIG. 6 is a graph illustrating example results obtained in accordance with the present implementations.

FIG. 6 is a graph illustrating example clock recovery results for Random Jitter using bin map logic according to embodiments, as implemented in a verification system such as that shown in FIG. 5. More specifically, FIG. 6 is a graph showing the random jitter for an agent during a simulation. The X-axis denotes the different points where data is being sampled. 602 captures clock varying due to jitter as data toggles. The Y-axis denotes the time difference between the data toggle and the clock edge.

Figure 7:
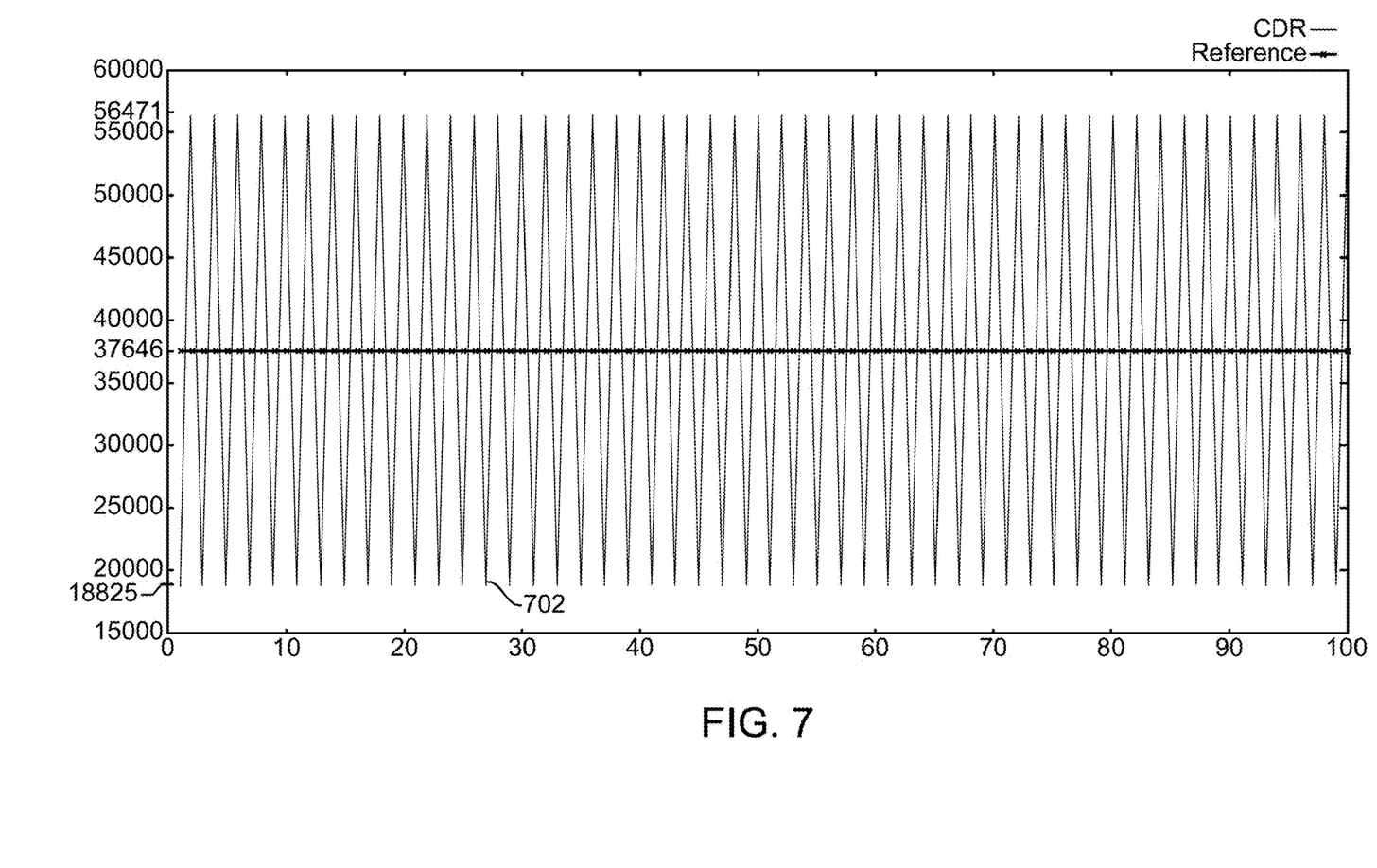
FIG. 7 is a graph illustrating example results obtained in accordance with the present implementations.

FIG. 7 is a graph illustrating example clock recovery results for maximum jitter using bin map logic according to embodiments, as implemented in a verification system such as that shown in FIG. 5. More specifically, FIG. 7, is a graph showing the Max tolerance values supported for a design, which will vary for different speeds or protocols. The X-axis denotes the different points where data is being sampled. 702 captures clock varying due to jitter as data toggles. The Y-axis denotes the time difference between the data toggle and the clock edge.

Present implementations can advantageously be applied at least in Ethernet design and verification systems and devices.

Figure 8:
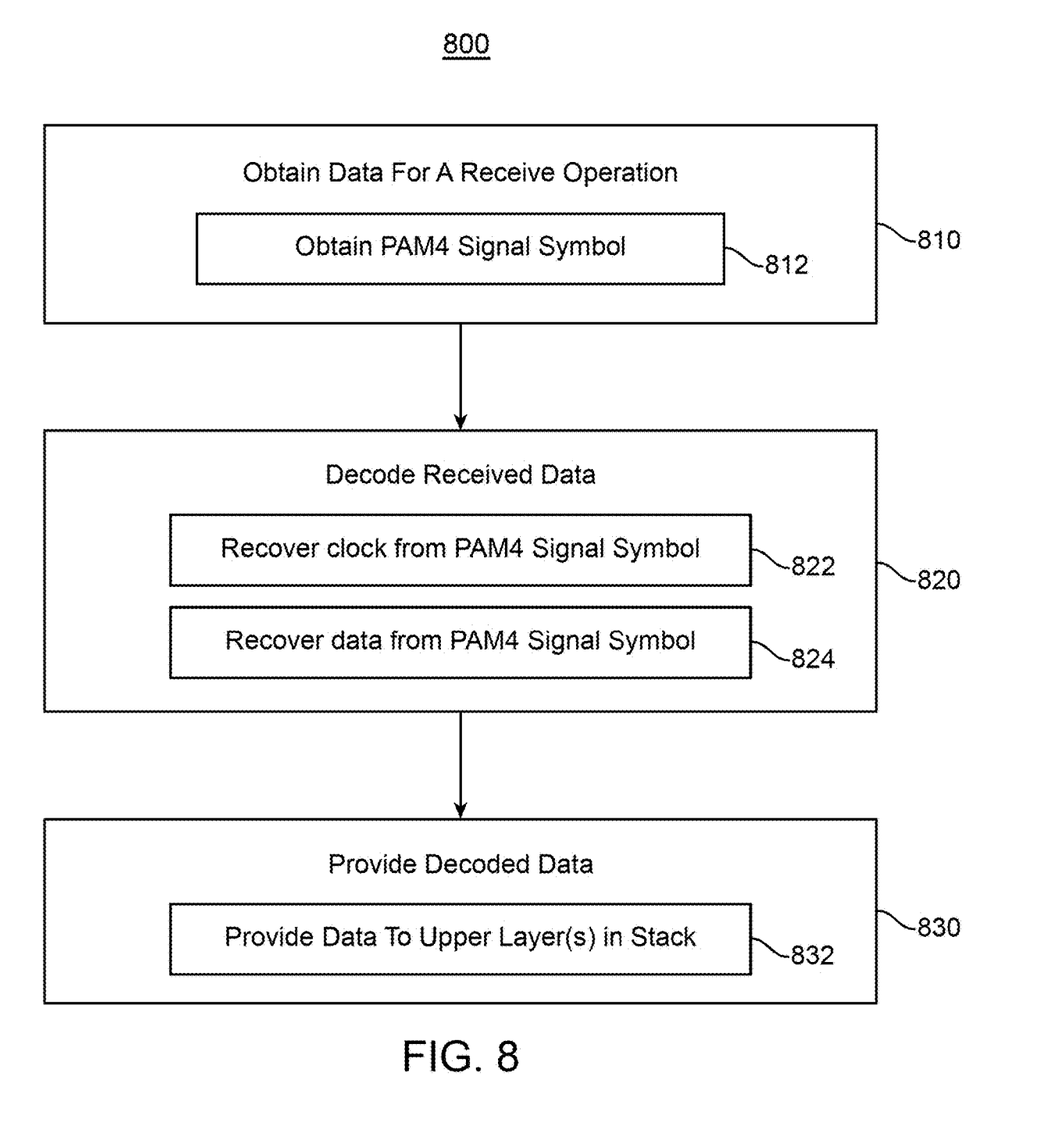
FIG. 8 illustrates a method of data communications using a physical layer of communication devices and systems, in accordance with present implementations.

FIG. 8 illustrates an example method 800 of data communications in accordance with present implementations. The device, system or apparatus 300, 400, or 500 can perform method 800 according to present implementations.

The method 800 can begin at block 810. At block 810, the method 800 can obtain data at the physical communication layer (e.g. PMA layer). Block 810 can include at least block 812. At block 812, the method 800 can obtain a 2-bit PAM4 signal symbol including a MSB and a LSB from a network interface such as an Ethernet 50 GKR1 interface. The method 800 can then continue to block 820.

At block 820, the method 800 can decode data received from a lane of a network interface at the physical communication layer (e.g. PMA layer). Block 820 can include at least one or both of block 822 and block 824.

At block 822, the method 800 can recover clock from a 2-bit PAM4 signal symbol. The 2-bit PAM4 signal symbol can be the symbol received at block 812, for example. Block 822 can include recovering an individual clock for each of the 2 bits by detecting the signal level once per symbol period using one edge detector per bit. Both the clocks can be passed on to a bin map logic (e.g. 402 shown in FIG. 4B) to recover a common clock. Block 822 can include detecting the last active edge between the independently recovered clocks using flip-flops. Block 822 can include resetting the flip-flops once the edges of the both clocks are detected. Block 822 can include creating a gating signal from edges of both of the clocks. Block 822 can include creating the recovered output clock by AND-ing a reference clock with the gating signal.

At block 824, the method 800 can recover data from the PAM4 signal symbol, for example creating recovered data using the recovered clock. The recovered clock can be used to aid in synchronization between a transmitter and a receiver in the presence of jitter, for example. The method 800 can then continue to block 830.

At block 830, the method 800 can provide the data using the physical communication layer (e.g. PMA layer). Block 830 can include at least block 832. At block 832, the method 800 can transmit the recovered data from the physical communication layer (e.g. PMA layer) to upper layers in a protocol stack (e.g. a logical communication layer or FEC layer). The recovered data can be data recovered in block 824, for example. The method 800 can end at block 830.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"). The same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A clock recovery apparatus for multi-level signaling on a single lane communication interface, comprising:
   bin-map logic to recover a common clock from each individual clock corresponding to each bit in a multi-bit symbol received on the single lane communication interface using the multi-level signaling.

2. The apparatus of claim 1, wherein the multi-level signaling is PAM4 signaling, and the multi-bit symbol comprises two bits.

3. The apparatus of claim 2, wherein the bin-map logic detects a signal level of each individual clock using an edge detector for each of the two bits in the symbol.

4. The apparatus of claim 3, wherein the edge detector includes first and second edge detectors for first and second bits, respectively, in the symbol.

5. The apparatus of claim 1, wherein the communication interface includes an Ethernet stack having a physical communication layer.

6. The apparatus of claim 5, wherein the physical communication layer includes a physical medium attachment (PMA) layer.

7. The apparatus of claim 1, wherein the clock recovery apparatus further includes bit-wise clock and data recovery circuits for independently recovering clocks from each bit in the multi-bit symbol.

8. The apparatus of claim 7, wherein the independently recovered clocks are provided to the bin-map logic.

9. The apparatus of claim 8, wherein the bin-map logic detects the last active edge between the independently recovered clocks using respective flip-flops.

10. The apparatus of claim 9, wherein the bin-map logic further includes logic for creating the recovered common clock using the outputs of the flip-flops and a reference clock.

11. The apparatus of claim 1, further comprising:
    a plurality of clock recovery circuits respectively corresponding to each bit in the multi-bit symbol, wherein each of the clock recovery circuits is configured to generate a corresponding one of the individual clocks.

12. A method for communicating data, comprising:
    obtaining data at a physical communication layer of a network protocol stack; and
    decoding multi-bit symbols corresponding to the obtained data, including recovering a common clock from multiple individual clocks respectively corresponding to each bit in the multi-bit symbols.

13. The method of claim 12, wherein recovering the common clock is performed using logic that is configured to detect an edge of each individual clock.

14. The method of claim 12, wherein obtaining data includes using PAM4 signaling at the physical communication layer.

15. The method of claim 14, wherein the common clock is recovered from a 2-bit PAM4 signal symbol.

16. The method of claim 15, wherein recovering the common clock includes recovering the common clock from two individual clocks respectively corresponding to the two bits in the 2-bit PAM4 signal symbol.

17. The method of claim 16, wherein the recovering the common clock from the two individual clocks includes detecting an edge of each of the two individual clocks once per symbol period.

18. The method of claim 15, wherein recovering the common clock includes:
    detecting a last active edge between the individual clocks using flip-flops;
    resetting the flip-flops once the edges of both individual clocks are detected;
    creating a gating signal from edges of both of the individual clocks; and
    creating the recovered common clock by AND-ing a reference clock with the gating signal.

19. The method of claim 12, wherein the network protocol stack is a 50 Gbps Ethernet protocol stack.

* * * * *